United States Patent Office 3,320,206
Patented May 16, 1967

---

3,320,206
VINYL FLUORIDE RESINS STABILIZED WITH MIXTURES OF THIODIALKANOIC ACID ESTERS AND ALIPHATIC POLYOL
Clifford A. Neros, Willoughby, Ohio, assignor to Diamond Alkali Company, Cleveland, Ohio, a corporation of Delaware
No Drawing. Filed May 25, 1964, Ser. No. 370,075
16 Claims. (Cl. 260—41)

The present invention relates to the stabilization of fluorine containing vinyl resins, particularly vinyl fluoride resins. Specifically, the present invention is particularly applicable to the stabilization of pigmented vinyl fluoride polymer resin composition and coated articles therefrom.

Vinyl fluoride polymers particularly in the form of films and coatings, display a combination of excellent properties, e.g., weatherability (resistance to degradation when exposed to outdoor conditions), pliability and strength (flexural, tensile and tear) well within desirable ranges. Due to the fact that vinyl fluoride polymer deteriorates upon heating prior to its reaching the high temperatures necessary to prepare a film or coating and the polymer is insoluble in commonly used volatile solvents, such as acetone, petroleum ether, iso-octane, xylene, etc., it has been found necessary to disperse the vinyl fluoride resin in the form of discrete particles in a suitable liquid medium which has substantially no solvent action on the polymer at room temperature, but which is capable at elevated temperatures of coalescing the polymer particles. However, vinyl fluoride polymers still are subject to severe degradation and consequent discoloration upon exposure to the high temperatures necessary for fusion of the polymer. Lack of such stability is a serious obstacle to the commercial exploitation of this polymer.

While considerable activity has been undertaken in the field of polymer stabilization in an attempt to improve heat stability of vinyl-type resins and numerous additives have been suggested and tried as polymer additives for incorporation in vinyl resins to prevent or minimize such deterioration, none of these stabilizers has been found effective for a vinyl fluoride polymer system, particularly a pigmented vinyl fluoride polymer system. In other words, the prior art stabilizers or stabilizer systems which are effective to inhibit the deterioration of a vinyl polymer not containing other additives have been found to be ineffective in a vinyl fluoride polymer system containing latent solvent and pigment. Using a wide variety of stabilizers and stabilizer systems suggested in the prior art, vinyl fluoride polymer coating systems containing latent solvent and pigment become discolored at the fusion temperatures generally employed to bake satisfactorily the coating to a substrate. To date, there has been found no stabilizer or stabilizer system effective to prevent discoloration of both a vinyl fluoride polymer and a vinyl fluoride polymer system containing the resin, latent solvent therefor and pigment.

Accordingly, it is an object of this invention to provide a stabilized vinyl fluoride polymer having an increased resistance to color degradation or deterioration.

It is a further object of the present invention to provide a pigmented vinyl fluoride polymer system having increased resistance to color degradation or deterioration upon baking at elevated temperatures.

The above and related objects are achieved by incorporating in the vinyl fluoride polymer or vinyl fluoride polymer system comprising vinyl fluoride polymer, latent solvent therefor and pigment, a stabilizing quantity of a mixture of a diester of a thiodialkanoic acid having the general formula $S(C_nH_{2n}COOR)_2$, wherein $n$ is an integer from about 1 to 8 and R is a hydrocarbon radical (aliphatic, straight or branched, cyclic or aromatic, saturated or unsaturated, substituted or unsubstituted) from about 6 to 20 carbon atoms and an aliphatic polyol having at least two to about eight alcoholic hydroxyl groups for each two to about fifteen carbon atoms.

Exemplary of suitable diesters of thiodialkanoic acid include dilauryl thiodipropionate, dimyristyl thiodipropionate, dicetyl thiodipropionate, distearyl thiodipropionate, dicinnamyl thiodipropionate, dibenzylthiodipropionate, dicyclohexylthiodipropionate, dilauryl thiodibutyrate, etc., and mixtures thereof, e.g., 70% dilauryl thiodipropionate, 20% dimyristyl thiodipropionate and 10% dicetyl thiodipropionate. Preferably, the thiodialkanoic acid employed is dilauryl thiodipropionate.

Exemplary of suitable polyols include trimethylolethane, trimethylolpropane, pentaerythritol, dipentaerythritol, tripentaerythritol, sorbitol, mannitol, methylglucoside, sucrose, hydroxy propylsucrose (hyprose) and mixtures thereof; their partial esters with a carboxylic acid; polyhydroxy substituted acids such as gluconic, arabonic and glucoheptoic acids; their lactones; salts, e.g., sodium, potassium and ammonium, and esters, e.g. $C_4$–$C_{18}$ alkyl esters. These polyols are disclosed in U.S. Reissue Patent 25,451 and is hereby incorporated by reference. In addition to the combination of the diester of a thiodialkanoic acid and polyol in the stabilizing system the oxides, hydrates and carbonates of the alkaline earth metals also may be present without effecting any of the desired results. Of the alkaline earth material, barium peroxide is preferred.

In addition to the homopolymers of vinyl fluoride, there may be employed copolymers of vinyl fluoride with other monoethylenically unsaturated monomers, copolymerizable therewith, wherein the vinyl fluoride is present in substantial or in major amounts, i.e., at least 75 to 80% of the total by weight. Examples are monoethylenic hydrocarbons, e.g., ethylene, propylene, isobutylene and styrene; halogen-substituted monoethylenic hydrocarbons, e.g., vinyl chloride, vinyl bromide, 1,1-dichloroethylene, 1,1-difluoroethylene, difluorochloroethylene, trifluorochloroethylene, tetrachloroethylene, trifluoropropylene, difluoroisobutylene; vinyl esters, e.g., vinyl formate, vinyl acetate, vinyl propionate, vinyl butyrate, vinyl benzoate, vinyl pivalate, vinyl stearate, vinyl salicylate and vinyl esters of inorganic acids; vinyl ethers, e.g., vinyl ethyl ether, tetrafluoroethyl allyl ether and vinyl dioxolane; vinyl ketones, e.g., methyl vinyl ketone; N-vinyl imides, e.g., N-vinyl succinimide and N-vinyl phthalimide; acrylic and methacrylic acids and their derivatives, e.g., ethers, nitriles, amides, anhydrides and acid halides, including methyl methacrylate, beta hydroxyethyl methacrylate, allyl methacrylate, acrylonitrile, N-butyl methacrylamide, etc.; derivatives of maleic and fumaric acids, e.g., diethylmaleate and dimethylfumarate; propenyl esters; e.g., allyl acetate, isopropenyl acetate, etc. The presence in these copolymers of even a small percentage of a comonomer which, as a homopolymer, is normally more soluble in the selected latent solvent than is the homopolymer of vinyl fluoride, may render said copolymer sufficiently more soluble in aforementioned latent solvent as to permit its application on a substrate containing considerably less solvent than is needed in the application of homopolymers of vinyl fluoride.

Suitable vinyl fluoride polymers have an intrinsic viscosity of at least about 0.35 and preferably at least about 1. The polymer particles may comprise up to about 30 microns in diameter, preferably the diameter of the polymer particles is below about 20 microns. The size of the polymer particle may be reduced by a variety of means known in the art, such as ball milling or grinding. Although particle sizes as low as 0.005 micron may be employed, it is preferable that the size of the particle be within the range of 0.05 to 5 microns. The particles in a given dispersion need not be uniform in size.

The latent solvents which may be used in the dispersion system of the present invention generally have boiling points of at least about 100° C., preferably boiling points above about 120° C., but below the point at which the vinyl fluoride polymer begins to deteriorate or degrade. The latent solvent employed need not necessarily be liquid at room temperature provided its melting point is not so high that the temperature necessary for liquid blending of the latent solvent does not subject the polymer to thermal degradation.

Following are examples of specific compounds representative of the class of latent solvents useful in the process of the present invention: gamma butyrolactone, butadiene cyclic sulfone, tetramethylenesulfone, dimethylsulfolane, hexmethylenesulfone, diallylsulfoxide, dimethylsulfoxide, dicyanobutene, adiponitrile, ethylene carbonate, propylene carbonate, 1,2-butylene carbonate, 2,3-butylene carbonate, isobutylene carbonate, trimethylene carbonate, N,N-diethylformamide, N,N-dimethylacetamide, N,N- dimethylformamide, N,N - dimethyl - gamma - hydroxyacetamide, N,N - dimethyl - gamma - hydroxybutyramide, N,N - diethylacetamide, N,N - dimethylmethoxyacetamide, N - methylacetamide, N - methylformamide, N,N-dimethylaniline, N,N-dimethylethanolamine, 2-piperidone, N-methyl-2-piperidone, N-methyl-2-pyrrolidone, N-ethyl-2- pyrrolidone, N-isopropyl-2-pyrrolidone, 5-methyl-2-pyrrolidone, beta-propiolactone, delta-valerolacetone, gamma - valerolectone, alpha - angelicalactone, beta - angelica - lactone, epsilon - caprolactone, and alpha, beta and gamma - substituted alkyl derivatives of gamma-butyrolactone, gamma - valerolactone and delta valerolactone, as well as delta-substituted alkyl derivatives of delta-valerolactone, tetramethyl urea, 1-nitropropane,2-nitropropane, acetonyl acetone, acetophenone, acetyl acetone, cyclohexanone, diacetone alcohol, dibutyl ketone, isophorone, mesityl oxide, methylamyl ketone, 3-methylcyclohexanone, bis - (methoxymethyl)uron, methylacetylsalicylate, diethyl phosphate, dimethyl phthalate, ethyl acetoacetate, methyl benzoate, methylene diacetate, methyl salicylate, phenyl acetate, triethyl phosphate, tris-(morpholino)phosphine oxide, N-acetylmorpholine, N-acetylpiperidine, isoquinoline, quinoline, pyridine and tris-(dimethylamido)phosphate.

Of the many pigments employed white pigments have been the most successfully used in coating exterior surfaces. Titanium dioxide has been the most widely employed while inorganic pigmentary substance probably because of a combination of innate properties it possesses, i.e., high refractive index, lack of color (whiteness), physical and chemical stability and relatively low specific gravity. Titanium dioxide pigments are classified as either "chalking" or "non-chalking." Chalking-type pigment is characterized by a gradual film deterioration to a powdery chalk which is removed by the eroding action of wind and rain to expose the underlying section to further attack resulting in a progressive wearing away of the coating system. Anatase crystal modification of titanium dioxide exhibits this chalking characteristic. For most commercial coating applications, however, chalking-type pigments are not employed for the above reason.

The rutile crystal modification of titanium dioxide, especially rutile crystals treated with silicon, aluminum or zinc, exhibits non-chalking characteristics. Like the chalking, crystal-type modification, anatase, color development also occurs with rutile during the baking operation. Unlike dispersion coating systems containing the chalking-type pigment, dispersion coating systems containing the non-chalking type pigment are difficult to stabilize and are not necessarily stabilized with compounds found suitable to stabilize a system containing the chalking-type pigment. However, using the stabilization system of the present invention whatever form of crystal modification of titanium dioxide is employed the resultant pigmented vinyl fluoride polymer coating is resistant to discoloration on baking and subsequent aging.

In addition to the reactive pigment the dispersion system may contain other highly divided solid pigments, pigment extenders, fillers or the like and other conventionally used compounding pigmented systems such as lithopone, zinc sulfide, iron dioxide, mica china clay, mineral silicate and coloriferous agents. Also protective colloids and pigment dispersing or deflocculating agents, such as tetrasodium pyrophosphate or potassium thipolyphosphate may be employed.

The proportions of vinyl fluoride polymer, latent solvent, pigment and stabilizer may vary depending on the type of application and the method of application desired. The amount of latent solvent is adjusted to give a fluid or sometimes viscous composition that is of suitable consistency for application to the particular substrate which is to be coated. This, of course, will vary greatly according to the manner of application; for instance, whether it is desired to spray the dispersion on the substrate, to dip the substrate into the dispersion or to apply the dispersion on the substrate with some sort of roller system as well as other factors such as temperature, type of liquid dispersants employed and the like.

Generally, however, from about 25 to 400 parts, preferably about 50 to 200 parts, by weight, of latent solvent per 100 parts of vinyl fluoride polymer have been found suitable. The stabilizer system may be incorporated into the resin system in stabilizing concentrations from about 0.05 to 10 parts, preferably about 0.1 to about 3 parts, by weight, based on 100 parts, by weight, or vinyl fluoride polymer. The ratio of the thiodialkanoic acid ester to polyol is within the range of about 0.25 to 4:1, preferably 0.5 to 1.5:1, with an especially preferred ratio being 1:1. The pigment is present in the dispersion system within the range from about 5 to 30 parts, by weight, preferably 10 to 20 parts, by weight, per 100 parts, by weight, of vinyl fluoride polymer. If an alkaline earth metal oxide, hydrate or carbonate is employed it is present in the system in amounts from about 0.1 to 3 parts per 100 parts of polymer, preferably this material is present in an equal portion to either the thiodialkanoic acid ester and/or polyol employed. Other ingredients which generally are employed in dispersion coating systems may be added to the vinyl fluoride polymer dispersion system of the present invention. Exemplary of these additives are thickening agents, i.e., polymethylmethacrylates, polymethylmethacrylate copolymers of acrylonitrile with methomethacrylate, vinyl resins, carboxy vinyls, cellulose acetate and the like; neutralizing agents, i.e., amines and the like.

The polyvinyl fluoride dispersion system may be prepared by blending the vinyl fluoride polymer, latent solvent therefor, pigment and stabilization system in a wide variety of mixing equipment, including Hobart mixers, Waring Blendors, ball mills, colloid mills, sand grinding equipment and the like. Advantageously, a pigment slurry containing the pigment, stabilization system and part of the latent solvent first is prepared in order to grind and disperse thoroughly the pigment before introducing the vinyl fluoride polymer. Also, in order to facilitate further dispersing the vinyl fluoride polymer, a solvent solution containing the remaining portion of latent solvent to be employed and other additives such as thickening agents and like ingredients may be prepared beforehand to ensure solution. Once the pigment slurry and latent solvent solution have been prepared, the vinyl fluoride polymer then may be incrementally added to the pigment slury-latent solvent solution mixture in a high speed agitator followed by a ball milling of the resultant dispersion, if desired.

A great variety of substrates may be coated in accordance with this invention. For example, leather, cloth resins, wood, stones, concrete, cement and of special interest coatings for metals including steel, aluminum, iron, magnesium and nickel and any alloy thereof.

After the vinyl fluoride polymer dispersion system of the present invention has been applied as a coating to the substrate, adhesion is achieved by employing heat to cure the dispersion system without discoloration or decomposition of the coating during baking. The heat curing of the pigmented vinyl fluoride polymer dispersion system may proceed by the method disclosed in copending patent application, Ser. No. 273,550, filed April 17, 1963, hereby incorporated by reference. The method disclosed therein comprises heat curing the applied vinyl fluoride polymer under controlled conditions involving an initial heat step sufficient to coalesce the pigmented polyvinyl fluoride on the substrate followed by a post-cure heating conducted at a temperature of at least about 50° F. above the initial heat curing treatment. Alternatively, the applied pigmented polyvinyl fluoride dispersion coating may be heat cured in a single heat treating step comprising heating the applied pigmented polyvinyl fluoride dispersion coating at an elevated temperature, generally in excess of about 450° F., for a sufficient period of time to effect adhesion of the coating to the substrate. (This method is disclosed in copending patent application, Ser. No. 370,118 filed May 25, 1964, hereby incorporated by reference.)

In order that those skilled in the art may more completely understand the present invention and the preferred method by which the same may be carried into effect the following specific examples are offered

EXAMPLE I

A series of white pigmented polyvinyl fluoride dispersion systems containing titanium dioxide from various commercial sources and employing various stabilizers are prepared having the following recipe:

| Component: | Parts by weight |
|---|---|
| Polyvinyl flouride | 100.00 |
| Dimethylacetamide, to make (solids) pct. | 28–32 |
| Titanium dioxide pigment | 15.00 |
| Stabilizer | 0–3.0 |

The polyvinyl fluoride employed has an intrinsic viscosity of 1.40. The pigmented polyvinyl fluoride dispersion is prepared by first making a pigment slurry and solvent solution and then incrementally mixing into this mixture the polyvinyl fluoride. The ingredients are ground in a ball mill for 24 hours after which the pigmented dispersion is deaerated to remove all contained air.

The prepared pigmented polyvinyl fluoride dispersions are applied to anodized aluminum panels (6 x 12" chromate-treated aluminum panels supplied by Q-Panel Company, Cleveland, Ohio) by means of a Baker film applicator to give a dry film thickness of about 1 mil. The wet films are heated for 4 minutes in a hot air circulating oven at 500° F. Observations are then made concerning color retention and adhesion of the finished pigmented coating. The particular stabilizers employed and data obtained from the color retention test and adhesion test for each coating are reported in Table I, below. For convenience, the stabilizers and stabilizer systems tested are coded as follows:

STABILIZER

| Trade Name | Compound | Code |
|---|---|---|
| Agerite Spar | Mixed mono-, di-, and tristyrenated phenols. | A |
| Agerite Superlite | Polybutylated Bisphenol–A | B |
| Bisphenol–A | 2,2'-bis(p-hydroxyphenyl)propane | C |
| Ionox 330 | 1,3,5-trimethyl-2,3,6-tris(3,5-di-tert-butyl-4-hydroxy phenyl) benzene. | D |
| Succonox 2 | N-acetyl-p-aminophenol | E |
| Irganox 565 | Multifunctional high molecular weight triazine. | F |
| Irganox 858 | do | G |
| | Pentaerythritol | H |
| Mark 225 | Polyol | I |
| Mark HH | do | J |
| Plastanox LTDP | Dilauryl-3,3'-thiodipropionate | K |

EXAMPLE II

Example I is repeated except that a stabilizer system is employed comprising a combination of ingredients. Each of the compounds in the stabilizer system is present in equal amounts. For convenience the stabilizer systems tested are identified and coded as follows:

| Stabilizer system: | Code |
|---|---|
| Dilauryl-3,3'-thiodipropionate+Mark 225 | L |
| Dilauryl-3,3'-thiodipropionate+Mark HH | M |
| Dilauryl-3,3'-thiodipropionate+pentaerythritol | N |
| Dilauryl-3,3'-thiodipropionate+Succonox 2 | O |
| Dilauryl-3,3'-thiodipropionate+Bisphenol A | P |
| Dilauryl-3,3'-thiodipropionate+$BaO_2$ | Q |
| Mark 225+$BaO_2$ | R |
| Dilauryl-3,3'-thiodipropionate+Mark 225+$BaO_2$ | S |

The data obtained from the color retention test and adhesion test for each of the stabilizer systems are reported in Table II, below.

TABLE I

| | | | TiO$_2$ Pigment | | | | | |
|---|---|---|---|---|---|---|---|---|
| | | | Titanox RA-NC | | Ti-Pure R-610 | | Unitane OR-450 | |
| Run No. | Stabilizer | Concentration (ppH) | Color Rating [1] | Adhesion Rating [2] | Color Rating | Adhesion Rating | Color Rating | Adhesion Rating |
| 1 | | | 1 | 1.0 | 1 | 1.0 | 1 | 1.0 |
| 2 | A | 0.75 | 1 | 1.5 | 1 | 1.5 | 1 | 1.5 |
| 3 | B | 0.75 | 1 | 1.5 | 1 | 1.0 | 1 | 1.5 |
| 4 | C | 0.75 | 2 | 1.5 | 1 | 1.5 | 2 | 1.5 |
| 5 | D | 0.75 | 1 | 1.0 | 1 | 1.0 | 1 | 1.5 |
| 6 | E | 0.75 | 2 | 1.0 | 1 | 1.0 | 2 | 1.5 |
| 7 | F | 0.75 | 1 | 1.5 | 1 | 1.0 | 1 | 1.5 |
| 8 | G | 0.75 | 1 | 1.5 | 1 | 1.0 | 1 | 1.5 |
| 9 | H | 0.75 | 1 | 2.0 | 1 | 1.5 | 1 | 2.0 |
| 10 | I | 0.75 | 1 | 1.5 | 1 | 2.5 | 1 | 2.0 |
| 11 | J | 0.75 | 1 | 3. | 1 | 1.5 | 1 | 2.0 |
| 12 | K | 0.75 | 1 | 1.0 | 1 | 1.0 | 1 | 1.5 |

[1] Color Rating:
1—Color development.
2—Off white.
3—No color development.

[2] Adhesion Rating:
1—Poor adhesion, coating easily peeled from aluminum.
2—Good adhesion, peeled only with considerable difficulty.
3—Excellent adhesion, cannot be peeled nor scraped at interface.

TABLE II

| Run No. | Stabilizer | Concentration (ppH) | TiO₂ Pigment | | | | | |
|---|---|---|---|---|---|---|---|---|
| | | | Titanox RA-NC | | Ti-Pure R-610 | | Unitane OR-450 | |
| | | | Color Rating [1] | Adhesion Rating [2] | Color Rating | Adhesion Rating | Color Rating | Adhesion Rating |
| 14 | L | 0.5 | 2 | 2.0 | 2 | 1.5 | 2 | 2.5 |
| 15 | L | 1.0 | 2 | 2.0 | 3 | 2.5 | 3 | 2.0 |
| 16 | L | 1.5 | 3 | 1.5 | 3 | 1.5 | 3 | 1.5 |
| 17 | M | 0.5 | 2 | 2.5 | 2 | 2.5 | 2 | 2.0 |
| 18 | M | 1.0 | 2 | 2.5 | 3 | 2.5 | 3 | 2.0 |
| 19 | M | 1.5 | 3 | 1.5 | 3 | 1.5 | 3 | 1.5 |
| 20 | N | 0.5 | 2 | 3 | 2 | 2.5 | 2 | 3.0 |
| 21 | N | 1.0 | 2 | 2.5 | 2 | 2.0 | 2 | 3.0 |
| 22 | N | 1.5 | 3 | 1.0 | 3 | 1.0 | 3 | 2.5 |
| 23 | O | 0.5 | 1 | 1.0 | 1 | 1.0 | 1 | 1.0 |
| 24 | O | 1.0 | 1 | 1.0 | 1 | 1.0 | 1 | 1.0 |
| 25 | P | 0.5 | 1 | 1.0 | 1 | 1.0 | 1 | 1.5 |
| 26 | P | 1.0 | 1 | 1.0 | 1 | 1.0 | 1 | 1.0 |
| 27 | Q | 0.5 | 2 | 1.0 | 2 | 1.0 | 2 | 3.0 |
| 28 | Q | 1.0 | 2 | 2.0 | 2 | 1.5 | 3 | 1.5 |
| 29 | R | 0.5 | 1 | 3.0 | 1 | 1.5 | 1 | 2.0 |
| 30 | S | 0.75 | 3 | 2.0 | 3 | 2.0 | 3 | 3.0 |

[1] Color Rating:
  1—Color development.
  2—Off white.
  3—No color development.
[2] Adhesion Rating:
  1—Poor adhesion, coating easily peeled from aluminum.
  2—Good adhesion, peeled only with considerable difficulty.
  3—Excellent adhesion, cannot be peeled nor scraped at interface.

It can be seen from the data in Table II employing the stabilization system of the present invention, i.e., runs 14 to 22 and 30, the color stability is improved over the use of the individual stabilizers. Further, employing barium peroxide (Run 30) in combination with equal parts of dilauryl thiodipropionate and polyol permits attaining excellent color stability at a lower concentration than in the absence of the barium compound.

It is to be understood that although the invention has been described with specific reference to particular embodiments thereof, it is not to be so limited since changes and alterations therein may be made which are within the full intended scope of this invention as defined in the appended claims.

What is claimed is:

1. A vinyl fluoride resinous composition comprising a major amount of a vinyl fluoride polymer containing at least 75% by weight of the total weight of the polymer of vinyl fluoride and a minor amount sufficient to improve stabilization of said polymer of a stabilizer comprising a mixture of a thiodialkanoic acid ester having the formula:

$$S(C_nH_{2n}COOR)_2$$

wherein $n$ is an integer from about 1 to 8 and R is a hydrocarbon radical from about 6 to 20 carbon atoms and an aliphatic polyol having at least two to about eight alcoholic hydroxyl groups for each two to about fifteen carbon atoms said stabilizer being present in amounts from about 0.5 to 10 parts, by weight, based on 100 parts, by weight, of vinyl fluoride polymer, said ester and polyol being present in said composition in an ester to polyol ratio within the range of 0.25 to 4:1.

2. A vinyl fluoride resinous composition comprising a vinyl fluoride polymer containing at least 75% by weight of the total weight of the polymer of vinyl fluoride, a latent solvent therefor, pigment and a stabilizer comprising a mixture of a thiodialkanoic acid ester having the formula:

$$S(C_nH_{2n}COOR)_2$$

wherein $n$ is an integer from about 1 to 8 and R is a hydrocarbon radical from about 6 to 20 carbon atoms and an aliphatic polyol having at least two to about eight alcoholic hydroxyl groups for each two to about fifteen carbon atoms said stabilizer being present in amounts from about 0.5 to 10 parts, by weight, based on 100 parts, by weight, of vinyl fluoride polymer, said ester and polyol being present in said composition in an ester to polyol ratio within the range of 0.25 to 4:1.

3. The composition of claim 2 wherein the pigment is titanium dioxide.

4. The composition of claim 3 wherein the titanium dioxide pigment is non-chalking.

5. The composition of claim 2 wherein the thiodialkanoic acid ester is dilauryl thiodipropionate.

6. The composition of claim 3 wherein the oxide is barium peroxide.

7. A vinyl fluoride resinous composition comprising 100 parts, by weight, vinyl fluoride polymer containing at least 75% by weight of the total weight of the polymer of vinyl fluoride, 25 to 400 parts, by weight, latent solvent therefor, 5 to 30 parts titanium dioxide pigment based on the weight of polymer and 0.05 to 10 parts, by weight, of a stabilizer, based on the weight of polymer, comprising an ester of a dialkanoic acid having the general formula:

$$S(C_nH_{2n}COOR)_2$$

wherein $n$ is an integer from about 1 to 8 and R is a hydrocarbon radical from about 6 to 20 carbon atoms and an aliphatic polyol having at least two to about eight alcoholic hydroxyl groups for each two to about fifteen carbon atoms, said ester and polyol being present in said composition in an ester to polyol ratio within the range of 0.25 to 4:1.

8. The composition of claim 7 wherein the titanium dioxide pigment is non-chalking.

9. The composition of claim 7 wherein the ester is dilauryl thiodipropionate.

10. The composition of claim 7 additionally containing 0.1 to 3 parts, by weight, based on the weight of polymer barium oxide.

11. A method of stabilizing a vinyl fluoride polymer dispersion coating containing a vinyl fluoride polymer containing at least 75% by weight of the total weight of the polymer of vinyl fluoride, a latent solvent therefor and a pigment which comprises admixing in said dispersion coating a stabilizer comprising a mixture of an ester of a thiodialkanoic acid having the general formula:

$$S(C_nH_{2n}COOR)_2$$

wherein $n$ is an integer from about 1 to 8 and R is a hydrocarbon radical from about 6 to 20 carbon atoms and an aliphatic polyol having at least two to about eight alcoholic hydroxyl groups for each two to about fifteen carbon atoms said stabilizer being present in amounts from about 0.5 to 10 parts, by weight, based on 100 parts, by weight, of vinyl fluoride polymer, said ester and polyol being present in said composition in an ester to polyol ratio within the range of 0.25 to 4:1.

12. The method of claim 11 wherein the pigment is titanium dioxide.

13. The method of claim 12 wherein the titanium dioxide pigment is non-chalking.

14. The method of claim 11 wherein the thiodialkanoic acid ester is dilauryl thiodipropionate.

15. The method of claim 11 wherein the oxide is barium peroxide.

16. As an article of manufacture a substrate having secured thereto a pigmented vinyl fluoride polymer coating, said coating being prepared from a dispersion system comprising a vinyl fluoride polymer containing at least 75% by weight of the total weight of the polymer of vinyl fluoride, a latent solvent therefor, a pigment and a stabilizer comprising a mixture of an ester of a thiodialkanoic acid having the general formula:

$$S(C_nH_{2n}COOR)_2$$

wherein $n$ is an integer from about 1 to 8 and R is a hydrocarbon radical from about 6 to 20 carbon atoms and an aliphatic polyol having at least two to about eight alcoholic hydroxyl groups for each two to about fifteen carbon atoms said stabilizer being present in amounts from about 0.5 to 10 parts, by weight, based on 100 parts, by weight, of vinyl fluoride polymer, said ester and polyol being present in said composition in an ester to polyol ratio within the range of 0.25 to 4:1.

References Cited by the Examiner
UNITED STATES PATENTS

| | | | |
|---|---|---|---|
| 3,038,878 | 6/1962 | Bell et al. | 260—45.85 |
| 3,243,408 | 3/1966 | Donoian et al. | 260—45.85 |

MORRIS LIEBMAN, *Primary Examiner.*

L. T. JACOBS, *Assistant Examiner.*